United States Patent Office 3,326,844
Patented June 20, 1967

3,326,844
POLYURETHANE COMPOSITION
Hermann Gruber, Leverkusen, Germany, assignor to Farbenfabriken Bayer Aktiengesellschaft, Leverkusen, Germany, a German corporation
No Drawing. Filed July 16, 1962, Ser. No. 210,219
Claims priority, application Germany, July 21, 1961,
F 34,493
6 Claims. (Cl. 260—40)

This invention relates to polyurethane plastics and more particularly to the preparation of polyurethane lacquers, adhesives, caulking compounds, sealants and the like.

It has been proposed hertofore to prepare substantially non-porous polyurethane plastics by reacting an organic polyisocyanate with an organic compound containing active hydrogen containing groups as determined by the Zerewitinoff method. In many cases, however, moisture is introduced either in the active hydrogen containing component or in some other ingredient which reacts with the organic polyisocyanate to produce urea linkages and carbon dioxide. The urea linkages are quite strong and often desirable, but the carbon dioxide causes bubbles to appear in the product which weakens the structure and indeed in some cases renders the product completely unsatisfactory.

A particular problem exists where pigmented polyurethane coatings or caulks have been prepared because the pigments contain water which is released at the time of reaction or only slowly over a long period of time so that the coatings or caulks have very poor pot life. The worst offenders are the commonly used pigments such as titanium dioxide, green chormium oxide, red iron oxide and the like. Attempts have ben made heretofore to dry these pigments before they are used but this requires expensive equipment. It has also been proposed to grind the pigments with the polyisocyanate in a ball mill so that the moisture in the pigment will react prior to combination with active hydrogen containing components. The grinding of the components has to be carried out under anhydrous conditions, eliminating atmospheric moisture and this again is expensive. Furthermore, if the pigment has very much moisture, dangerously high pressures are created in the ball mill due to the carbon dioxide which is split off. It has also been difficult heretofore to prepare solventless polyurethane caulks because one must either accept the bubble formation or use solvents in the caulks and sealants in order to provide a mechanism for the escape of the moisture which is invariably present in the common pigments set forth above.

It is therefore an object of this invention to provide substantially non-porous polyurethanes which are devoid of the foregoing disadvantages. Still another object of this invention is to provide improved polyurethane coating compositions which contain the common pigments. A further object of this invention is to provide polyurethane caulks and sealants which avoid premature gellation due to the presence of water in the composition. Another object of this invention is to provide a method of preparing polyurethane coatings which are substantially bubble-free. A further object of this invention is to provide an economic method of eliminating the moisture from polyurethane coating compositions.

The foregoing objects and others which will become apparent from the following description are accomplished in accordance with the invention, generally speaking, by providing polyurethane coating compositions containing an activated molecular sieve. Thus, this invention contemplates polyurethane coating compositions prepared by reacting an organic polyisocyanate with an organic compound containing at least two active hydrogen containing groups as determined by the Zerewitinoff method, the reaction mixture including an activated molecular sieve zeolite.

Any suitable molecular sieve zeolite may be used including both natural and synthetic molecular sieve zeolites. Suitable synthetic molecular sieve zeolites are described in U.S. Patents 2,882,243, 2,882,244 and in the Journal American Chemical Society, 78, 2338–9 and 5963–71 (1956). Suitable natural zeolites are chabazite, analcite and the like. The molecular sieve zeolites are referred to as molecular sieve zeolites 4A, 5A and 13X which have a pore size of 4, 5 and 13 Angstroms respectively. Molecular sieve zeolites 4A, 5A and 13X are available from Union Carbide Corporation and are particularly advantageous for use in preparing the coating compositions of the present invention. Generally speaking, the molecular sieve zeolites are a crystalline material which have a composition expressed in terms of oxides as follows:

$$1.0\pm0.2M_{2/n}O:Al_2O_3:1.85\pm0.5SiO_2:YH_2O$$

wherein M is hydrogen, ammonium, metals in Groups I and II of the Periodic Table and the transition metals of the Periodic Table, $n$ represents the valence of M, and Y is a number up to 6. It is preferred that the M represent a metal and most preferably sodium, calcium, magnesium, lithium, potassium or the like. Zeolite 4A has the chemical compostion $$0.96\pm0.04Na_2O:1.00Al_2O_3:1.92\pm0.09SiO_2:XH_2O$$

Zeolite 13X has the composition $$0.83\pm.05Na_2O:1.00Al_2O_3:2.48\pm0.03SiO_2:XH_2O$$

Zeolite 5A has the composition
$$1.0\pm0.2CaO:Al_2O_3:1.85\pm0.5SiO_2:YH_2O$$

Molecular sieve zeolites having a pore size of from about 4 to about 15 Angstroms are preferred. In the working examples set forth below, molecular sieve zeolites 4A, 5A and 13X have the composition set forth above.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene - 1,2 - diisocyanate, m-phenylene diisocyanate, 2,4-toluylene diisocyanate, 2,6-toluylene diisocyanate, 3,3'-dimethyl - 4,4'-biphenylene diisocyanate, 3,3'-dimethoxy - 4, 4' - biphenylene diisocyanate, 3,3'-diphenyl-4'4'-biphenylene diisocyanate, 4,4'-biphenylene diisocyanate, 3,3'-dichloro-4,4'-biphenylene diisocyanate, p,p',p''-triphenylmethane triisocyanate, 1,5 - naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2.4-toluylene diisocyanate and 20 percent 2,6-toluylene diisocyanate or 4,4'-diphenylmethane diisocyanate.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulfur atoms. Thus, suitable active hydrogen containing groups as determined by the Zerewitinoff method which are reactive with an isocyanate group include —OH, —NH₂, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alklyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present inventon such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organc compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthalic acid, hemimellitic acid, trimellitic acid, trimesic acid, mellophanic acid, prehnitic acid, pyromellitic acid, beieznepentacarboxylic acid, 1,4-cyclohexanedicarboxylic acid, 3,4,9,10 - perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol and the like in the preparation of the polyhydric polyalkylene ethers so that some branching exists in the product. Generally speaking, it is advantageous to condense from about 5 to about 30 mols of alkylene oxide perfunctional group of the trihydric or higher polyhydric alcohol. The polyhydric polyalkylene ethers may be prepared by any know process such as, for example, the proces disclosed by Wurtz in 1859 and in Encyclopedia of Chemical Technology, volume 7, pages 257 to 262, published by Interscience Publishers, Inc. (1951), or in U. S. Patent 1,922,459.

Any suitable polyhydric polythioether may be used such as, for example, the condensation product of thiodiglycol or the reacton product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexanediol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis(2-hydroxypropyl) ethylene diamine, as well as compounds of any of the classes set forth above which are substituted with halogen such as, for example, chloro, bromo, iodo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

The polyurethane coating compositions of the present invention are prepared in accordance with methods well known in the art except that the molecular sieve zeolite is added to the components other than the polyisocyanate far enough in advance of the combination with the polyisocyanate ingredient so that substantially all of the moisture in the reaction mixture will be sorbed on the sieve. Of course, it is necessary to activate the molecular sieve zeolite and this is done by simply heating it for a time sufficient to allow the water to escape through the pores in the sieve at a temperature above the temperature at which the water is normally retained by the molecular sieve. The activated molecular sieve zeolite is used in an amount sufficient to adsorb substantially all of the moisture in the reaction mixture. The molecular sieve zeolite is activated to drive off water and other adsorbed substances so that it will adsorb the moisture in the reaction mixture. The molecular sieve zeolite is combined with the moisture containing components in the activated state. Generally speaking, the molecular sieve zeolites may be activated by simply heating them for an hour to six hours at a temperature above about 300° C. and preferably above about 400° C. under a partial vacuum. When the molecular sieve zeolite has been so treated, for example, when the molecular sieve zeolite 4A has been subjected to a temperature of 400° C. under a partial vacuum for six hours it will adsorb 15 percent by weight of its weight of water.

It is sometimes desirable to combine all the lacquer ingredients including the isocyanate component. In such cases, especially if the reaction rate of the isocyanate is slow, it is also possible to mix the molecular sieve zeolite with the reaction mass having already incorporated the isocyanate.

The molecular sieve zeolite is usually employed in an amount of from about 0.5 to 50%, preferably from about 2 to 10%, calculated on the lacquer mass.

The invention is particularly applicable to the preparation of pigmented polyurethane coating compositions. Any suitable pigment may be used such as, for example, titanium dioxide, green chromium oxide, red iron oxide, carbon black, lamp black or any other suitable pigments, fillers and the like.

Any suitable inert organic solvent may be used where it is desired to make such a coating composition in an inert organic solvent including, for example, aromatic hydrocarbons such as xylene, toluene, benzene or aliphatic hydrocarbons such as heptane, hexane, octane and the like. Moreover, ethers and esters may be used such as, for example, ethylene glycol ether acetate, ethylacetate, the diethyl ether of ethylene glycol, diethyl ether of diethylene glycol and the like.

The coating composition and caulks of the present invention are useful where these types of compositions have been used heretofore, but have the advantages that they are free from bubbles and the consequent weaknesses caused by the reaction of the isocyanate with water in the system. They may be used to coat conventional substrates such as wood, metals such as steel, aluminum and the like, and they may be used to seal joints between wood and metal, concrete and metal, bricks and metal, bricks and wood or the like. A particularly advantageous use for these caulks and sealants is in the interstices between sections of concrete on an airport runway or the like.

The invention is further illustrated by the following examples in which the parts are by weight unless otherwise indicated.

EXAMPLE 1

About 300 parts of a phthalic acid-ethylene glycol polyester (about 2.2% —OH) and about 80 parts of an adipic acid-ethylene glycol polyester (about 5.2% —OH) are dissolved in about 200 parts of xylene and about 170 parts of ethylene glycol ether acetate

$(CH_3COOCH_2CH_2OCH_3)$

About 90 parts of titanium dioxide (about 0.4% $H_2O$) and about 13.5 parts of finely ground molecular sieve zeolite 4A activated by heating under partial vacuum for 3 hours at about 400° C. are admixed with about 125 parts of the said solution by means of a high-speed stirrer. The mixture is ground twice in a funnel mill and left to stand for one day. There are then added about 214 parts of a solution of about 750 parts of a reaction product of about 1 mol of trimethylol propane and about 3 mols of toluylene diisocyanate (—NCO content about 17.3%) in about 250 parts of ethyl acetate and about 290 parts of toluene and the mixture is poured into a vessel which can be satisfactorily sealed. The pigmented polyurethane composition manufactured in the manner described can still be worked satisfactorily after about 12 weeks (viscosity about 18 poises at 25° C.), whereas a comparison sample of a corresponding composition but without molecular sieve zeolite 4A gels after about 10 days.

EXAMPLE 2

About 300 parts of a phthalic acid-ethylene glycol polyester (about 2.2% —OH) and about 80 parts of an adipic acid-ethylene glycol polyester (about 5.2% —OH) are dissolved in about 200 parts of xylene and about 170 parts of ethyl glycol ether acetate. About 95 parts of red iron oxide (about 0.1% $H_2O$) and about 8.5 parts of finely ground, molecular sieve zeolite 5A activated as described in Example 1 are mixed in a high-speed stirrer with about 125 parts of the said solution. The mixture is ground twice in a funnel mill and left to stand for about one day. About 214 parts of a solution of the polyisocyanate according to Example 1 are added and the mixture is introduced into a vessel which can be tightly sealed. The pigmented polyurethane composition produced in the manner decsribed can still be worked satisfactorily after about twelve weeks (viscosity about 15 poises at 25° C.), whereas a comparison sample of corresponding composition but without molecular sieve zeolite 5A gels after about 14 days.

EXAMPLE 3

About 600 parts of a polyether (propylene oxide added to trimethylol propane; —OH content about 1.8%) are dissolved in about 650 parts of a solvent mixture consisting of equal parts of toluene, xylene and ethyl glycol ether acetate. About 80 parts of titanium dioxide of the rutile type and about 20 parts of molecular sieve zeolite 13X (activated for about 5 hours at about 350° C. under partial vacuum) are added to about 125 parts of the said solution. The mixture is dispersed by means of a funnel mill. About 100 parts of the solution of the polyisocyanate employed in Example 1 are immediately added and the mixture is left to stand. After about 19 weeks, the solution of the polyurethane composition can still be processed to form lacquer coatings. A comparison sample without molecular sieve zeolite 13X gels after about 12 days.

EXAMPLE 4

A mixture of about 40 parts of an adipic acid-ethylene glycol polyester (about 5.2% —OH), about 8 parts of castor oil and about 7.6 parts of diethylene glycol is formed into a paste with about 150 parts of the filler described below and about 20 parts of a sodium molecular sieve zeolite 4A activated at about 350° C. under a partial vacuum. The filler has approximately the following composition:

| | Parts |
|---|---|
| Calcium-magnesium carbonate | 162 |
| Heavy spar | 27 |
| Zinc sulphide/barium sulphate | 66 |
| Talcum | 30 |
| Zinc oxide | 9 |

About 32 parts of 4,4'-diphenyl methane diisocyanate are added to about 225 parts of the paste which has been described. After thorough mixing, a spreadable trowelling or caulking composition is obtained, which can be applied in the usual manner to a support for example wood or metal. The working time is about 20 minutes. Even in thick layers, the trowelling composition thoroughly hardens satisfactorily. At room temperature, the composition can still be ground after about 6 to about 8 hours and already after about 20 minutes with heat treatment (about 80° C.). The cured filler is free from bubbles, is insoluble in the conventional solvents and shows a good bonding strength with wood and metal.

A comparison mixture without the molecular sieve zeolite has a spongy structure, regardles of whether the hardening has taken place at room temperature or under heat.

EXAMPLE 5

About 500 parts of calcium-magnesium carbonate, about 270 parts of zinc sulphide/barium sulphate, about 95 parts of heavy spar, about 35 parts of zinc oxide and about 10 parts of finely dispersed silicon dioxide are mixed in a kneader. About 75 parts of the molecular sieve zeolite of Example 4 activated at about 400° C. under a partial vacuum are added, and after mixing for a short time, about 100 parts of castor oil and about 158 parts of blown castor oil are added. The composition is thoroughly kneaded, an improvement being produced by working under vacuum and/or at relatively high temperatures.

About 250 parts of the paste thus obtained are thoroughly mixed with about 35 parts of a mixture of about 115 parts of talcum and about 230 parts of 4,4'-diphenyl methane diisocyanate. A trowelling or caulking composition is obtained which can be used in the conventional manner for filling cavities or for smoothing surfaces. The working time is about 45 minutes. The hardening or curing takes about 6 hours at room temperature. By heat treatment, for example at about 80° C., a sufficient degree of hardness suitable for rubbing down is already obtained after about 30 minutes. The elasticity and bonding strength with wood, metal and concrete are good. The finally hardened trowelling compositions are substantially free from bubbles, even in thick layers.

EXAMPLE 6

About 100 parts of a polyether (propylene oxide added to trimethylol propane; —OH content about 12.4%) are intimately mixed on a funnel mill with about 10 parts of the molecular sieve zeolite 4A activated at about 350° C. under partial vacuum. The mixture is left to stand for 24 hours. About 105 parts of crude 4,4'-diphenyl methane diisocyanate (—NCO content about 29.4%), prepared by phosgenating the reaction product of aniline with formaldehyde which will produce the afore-mentioned —NCO content, are then added and stirred for about 10 minutes, while the temperature slowly rises. The mixture can then be poured into molds. The curing takes about 4 to 5 hours at room temperature, while at elevated temperature (about 80° C.) the casting composition hardens within about 15 minutes. Bubble-free castings are obtained which are heat-treated at about 80° C. for about 3 hours after removal from the mold and thereafter show a hard elastic behavior.

*Mechanical properties*

| | | |
|---|---|---|
| Impact toughness | kg/cm./cm.$^3$ | 36.4 |
| Bending strength | kg./cm.$^2$ | 940 |
| Bending angle | degrees | 48 |
| Ball-indentation hardness: | | |
| 10 sec. | kg./cm.$^2$ | 1325 |
| 60 sec. | kg./cm.$^2$ | 1220 |

EXAMPLE 7

About 675 part of the polyether prepared according to Example 6 and about 62 parts of hexane triol are intimately mixed by means of a funnel mill with about 92 parts of the activated molecular sieve zeolite used in Example 1. The mixture is left to stand for some hours and then there are added about 1125 parts of a prepolymer, prepared by reacting about 2000 parts of a polypropylene ether glycol (—OH content about 1.7%) and about 2400 parts of a mixture of 65 percent 2,4- and 35 percent 2,6-toluylene diisocyanate being heated for about 5 hours (about 60 to 70° C.). The mixture remains suitable for casting for about 30 minutes and hardens overnight to form a bubble-free elastic composition which acquires its final toughness by heating for about 3 hours to about 80° C. and has the following mechanical properties:

| | | |
|---|---|---|
| Hardness: | | |
| Shore A | | 97 |
| Shore D | | 69 |
| Tensile strength | kg./cm.$^2$ | 237 |
| Breaking elongation | percent | 170 |
| Elasticity | do | 28 |
| Resistance to further tearing | kg./cm | 68 |

EXAMPLE 8

About 1000 parts of road tar (coal tar, softening point about 50° C.) and about 165 parts of the polyether used in Example 6 are melted and mixed while hot with about 120 parts of the activated molecular sieve zeolite used in Example 1. About 380 parts of 4,4'-diphenyl methane diisocyanate are added to the warm mixture and, after thorough mixing, a product which can be cast is obtained. The curing takes about 3 hours. The material is free from bubbles, can be painted over with other coating agents without bleeding out, is plastic and is particularly suitable as a joint-sealing compound.

EXAMPLE 9

About 100 parts of an adipic acid-ethylene glycol polyester (—OH content about 6.5%) and about 600 parts of a short-oil alkyd resin (—OH content about 3.9%) prepared from 2.5 parts of maleic acid, 10.5 parts of adipic acid, 28 parts of phthalic acid and 46 parts of trimethylol propane modified with a saturated fatty acid of low molecular weight containing acids in the range of about 8 to 12 are dissolved in about 427 parts of a solvent mixture consisting of equal parts of ethyl acetate, butyl acetate, ethyl glycol ether acetate and toluene. About 40 parts of a 10 percent by weight solution of cellulose acetate butyrate in the said solvent mixture are added to the said solution. This mixture is thoroughly triturated by means of a funnel mill with about 600 parts of green chromium oxide and about 48 parts of activated molecular sieve zeolite used in Example 1. About 185 parts of 4,4'-diphenyl methane diisocyanate are added and the polyurethane composition is worked by brushing or spraying. The resulting coated films are smooth and bubble-free also in layers of about 300 microns whereas comparison specimens of corresponding composition but without the molecular sieve zeolite show an uneven surface caused by bubble-formation.

EXAMPLE 10

About 5 parts of finely powdered activated molecular sieve zeolite 4A and about 0.1 part of N-methyl-N'-dimethyl amino ethyl piperazine are mixed into about 100 parts of a polyester of adipic acid and diethylene glycol (—OH number about 56; acid number <1). After homogeneous distribution, about 12.5 parts of 4,4'-diphenyl methane diisocyanate are incorporated by stirring and the homogeneous bubble-free mixture is cast into dry joints. The composition is solid after about 1½ to 2 hours without any change in volume. In a comparison experiment not using the molecular sieve zeolite, the composition foams during solidification and emerges from the joint. The physical properties of the composition containing molecular sieve zeolite 4A are as follows:

| | Testing Specification |
|---|---|
| Shore Hardness A, 25 | DIN 53,505 |
| Tensile strength, kg./cm.$^2$, 14 | DIN 53,504 |
| Breaking elongation, percent, 220 | DIN 53,504 |
| Permanent elongation, percent, 2 | DIN 53,504 |
| Elasticity, percent, 30 | DIN 53,512 |

EXAMPLE 11

About 600 parts of castor oil and about 480 parts of propoxylated trimethylol propane (—OM number about 379) are mixed with about 1200 parts of green chromium oxide, about 240 parts of talcum and about 160 parts of activated potassium molecular sieve zeolite. After standing overnight, the paste is ground down. It is mixed with about 780 parts of 4,4'-diphenyl methane diisocyanate and the polyurethane composition is applied with a spray gun or brush. It is possible to apply it as a lacquer in layers of any desired thickness and without bubbles. The standing time of the solvent-free reaction lacquer is about one hour. The thoroughly hardened films are resistant to water and acid and are insoluble in the conventional solvents.

It is to be understood that the foregoing examples are given for the purpose of illustration and that any other suitable organic compound containing active hydrogen containing groups as determined by the Zerewitinoff method, organic polyisocyanate, pigment, solvent, molecular sieve zeolite or the like could have been used, provided that the teachings of the foregoing disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane coating composition which is substantially free from bubbles prepared by a process which comprises reacting an organic polyisocyanate with an organic compound having a molecular weight of at least above 200 and containing active hydrogen containing groups selected from the class consisting of —OH, —NH$_2$, —NH—, —COOH and —SH— while mixed with a substantially anhydrous uncoated molecular sieve zeolite which is activated by heating above 300° C. and capable of adsorbing substantially all the moisture in the reaction mixture and said molecule seive present in amounts of about 0.5–50% by weight of the coating composition.

2. The polyurethane coating composition of claim 1 wherein said organic compound is selected from the group consisting of hydroxyl polyesters prepared from a polyhydric alcohol and a polycarboxylic acid, polyhydric polyalkylene ethers and polyhydric polythioethers.

3. The coating composition of claim 1 wherein said organic polyisocyanate is the reaction product of 1 mol of trimethylol propane with 3 mols of toluylene diisocyanate.

4. The coating composition of claim 1 wherein said molecular sieve zeolite has a pore diameter of from about 4 to about 15 angstroms.

5. The coating composition of claim 1 wherein said molecular sieve zeolite is sodium zeolite 4A.

6. The compound of claim 1 wherein said molecular sieve is employed in an amount of from about 2 to about 10 percent by weight.

References Cited

UNITED STATES PATENTS 2,650,212  8/1953  Windemuth.
3,024,209  3/1962  Ferrigno.

OTHER REFERENCES

Linde: "Chemical Loaded Molecular Sieves," Form No. F–1311, six pages, Linde Co.

Linde: "Chemical Loaded Molecular Sieves in Rubber and Plastics," Form No. F–1349, twelve pages, Linde Co.

Linde: "General Information . . . ," Form 8605A, eight pages, Linde Co.

MORRIS LIEBMAN, *Primary Examiner.*

A. H. KOECKERT, J. FROME, *Assistant Examiners.*